US010146263B2

(12) United States Patent
Kim et al.

(10) Patent No.: US 10,146,263 B2
(45) Date of Patent: Dec. 4, 2018

(54) DISPLAY DEVICE HAVING IMPROVED DEFECT AND MOISTURE RESISTANCE

(71) Applicant: SAMSUNG DISPLAY CO., LTD., Yongin-si, Gyeonggi-do (KR)

(72) Inventors: Jin Hwan Kim, Seoul (KR); Joo-Han Bae, Seongnam-si (KR); Byeong-Jin Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 156 days.

(21) Appl. No.: 15/052,447

(22) Filed: Feb. 24, 2016

(65) Prior Publication Data
US 2016/0252991 A1 Sep. 1, 2016

(30) Foreign Application Priority Data

Feb. 27, 2015 (KR) .......................... 10-2015-0028562

(51) Int. Cl.
*G06F 3/041* (2006.01)
*G06F 1/16* (2006.01)

(52) U.S. Cl.
CPC .................................. *G06F 1/1656* (2013.01)

(58) Field of Classification Search
CPC .... G06F 1/1656; G06F 1/1647; G06F 3/0414; H04M 1/0268
See application file for complete search history.

(56) References Cited

U.S. PATENT DOCUMENTS

| 8,644,885 B1* | 2/2014 | Tseng | G06F 1/1637 455/566 |
| 2011/0157035 A1* | 6/2011 | Woo | G06F 3/016 345/173 |
| 2013/0127748 A1* | 5/2013 | Vertegaal | A47G 19/2227 345/173 |
| 2013/0300677 A1* | 11/2013 | Kim | G06F 3/0414 345/173 |

FOREIGN PATENT DOCUMENTS

| JP | 5-16450 | 3/1993 |
| KR | 10-0643186 B1 | 11/2006 |
| KR | 10-2010-0051818 A | 5/2010 |
| KR | 10-1082223 B1 | 11/2011 |
| KR | 10-1217802 B1 | 1/2013 |
| KR | 10-2013-0094611 A | 8/2013 |

* cited by examiner

*Primary Examiner* — Abbas Abdulselam
(74) *Attorney, Agent, or Firm* — Innovation Counsel LLP

(57) ABSTRACT

Provided is a display device including: a display panel configured to generate an image; a touch screen panel formed on the display panel; and a window formed on the touch screen panel and extending over a side edge of the touch screen panel to facilitate a covering and sealing of the touch screen panel. According to the present invention, by providing a display device having a laminated structure in which the edge of the touch screen panel is sealed so as to prevent moisture from permeating from the outside, occurrence of product defects may be prevented.

17 Claims, 10 Drawing Sheets

DISPLAY DEVICE HAVING IMPROVED DEFECT AND MOISTURE RESISTANCE

CROSS-REFERENCE TO RELATED APPLICATION

This application claims priority to, and the benefit of, Korean Patent Application No. 10-2015-0028562 filed in the Korean Intellectual Property Office on Feb. 27, 2015, the entire contents of which are incorporated herein by reference.

BACKGROUND OF THE INVENTION (a) Field of the Invention

Embodiments of the present invention relate generally to display devices, and more particularly to display devices having fewer defects and greater moisture resistance.

(b) Description of the Related Art

Recently, flat panel displays have found application in both large- and small-sized electronic products. Generally, the term "display device" refers to a device that converts electronic information to images that are visually recognized by humans. Various such display devices include an organic light emitting diode display, a liquid crystal display, and a plasma display device.

Further, many of these display devices operate by a touch method in which information input through a user's touch or other input devices is recognized as an input signal.

A display device having a touch type input system may have a laminated structure in which a touch screen panel is formed on the display panel and a window is formed on the touch screen panel, for protecting both the display panel and the touch screen panel.

This laminated structure has a structure vulnerable to external moisture, because a burning defect is generated at edges of each layer during laser cutting, and the edge of each layer is exposed to the environment after cutting.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a display device that is more resistant to defects generated by permeation of foreign substances such as moisture.

Further, a technical object to be achieved in the present invention is not limited to the aforementioned technical objects, and other technical objects besides those discussed will be understood by those skilled in the art from the description below.

An exemplary embodiment of the present invention provides a display device including: a display panel configured to generate an image; a touch screen panel formed on the display panel; and a window formed on the touch screen panel and including a first bent part of which one end is extended and bent to seal one end of the touch screen panel.

The display device may further include a polarization layer formed between the display panel and the touch screen panel.

The polarization layer and the touch screen panel may be disposed so that a side edge of the polarization layer is substantially aligned with the side edge of the touch screen panel.

The display device may further include a first adhesive layer formed on the touch screen panel and including a second bent part of which one end is extended and bent to correspond to the first bent part to seal one end of the touch screen panel.

The first adhesive layer may further include a third bent part extended and bent from the second bent part and attached onto the display panel.

The display device may further include a second adhesive layer interposed between the first adhesive layer and the display panel, and having a higher adhesion with the display panel than the first adhesive layer.

The first adhesive layer and the second adhesive layer may comprise heterogeneous materials, and at least one of the first adhesive layer and the second adhesive layer may include an acryl-based resin or a silicon-based resin.

The first bent part may be bent in a direction crossing an extending direction of one end of the touch screen panel disposed in parallel with the display panel to cover and seal one end of the exposed touch screen panel so as to block a contact with the outside.

The window may be made of a glass or a plastic.

Another exemplary embodiment of the present invention provides a method of manufacturing a display device, the method including: receiving a display panel configured to generate an image; positioning a touch screen panel on the display panel; positioning a window on the touch screen panel; and sealing the touch screen panel by a first bent part formed by extending and bending one end of the window.

The method may further include positioning a polarization layer on the display panel.

The positioning a polarization layer may further comprise positioning the polarization layer so that an edge of the polarization layer is substantially aligned with the side edge of the touch screen panel.

The method may further include forming a first adhesive layer interposed between the touch screen panel and the window, in which the sealing of the touch screen panel by the window layer may include forming a second bent part of which one end of the first adhesive layer is extended and bent to correspond to the first bent part to seal one end of the touch screen panel.

The sealing of the touch screen panel by the window layer may further include forming a third bent part extended and bent from the second bent part and attached onto the display panel.

The method may further include forming a second adhesive layer having higher adhesion with the display panel than the first adhesive layer, the second adhesive layer being interposed between the first adhesive layer and the display panel.

The bending one end of the window may further comprise heating and pressing the window.

The sealing of the touch screen panel by the window layer may further include forming a first bent part by bending one end of the window in a direction crossing an extending direction of one end of the touch screen panel disposed in parallel with the display panel to cover and seal one end of the exposed touch screen panel and block so as to block a contact with the outside.

According to exemplary embodiments of the present invention, it is possible to efficiently prevent foreign substances such as moisture from permeating into a touch screen panel. Therefore, it is possible to reduce a defect occurrence rate of products and contribute to increasing a lifespan of the products.

DETAILED DESCRIPTION OF THE EMBODIMENTS

Hereinafter, exemplary embodiments of the present invention will be described in detail with reference to the accompanying drawings. However, in describing the present invention, a description of already known functions or configurations will be omitted so as to make the subject matter of the present invention clear.

The various Figures are not to scale. All numerical values are approximate, and may vary. All examples of specific materials and compositions are to be taken as nonlimiting and exemplary only. Other suitable materials and compositions may be used instead.

Figure 1:
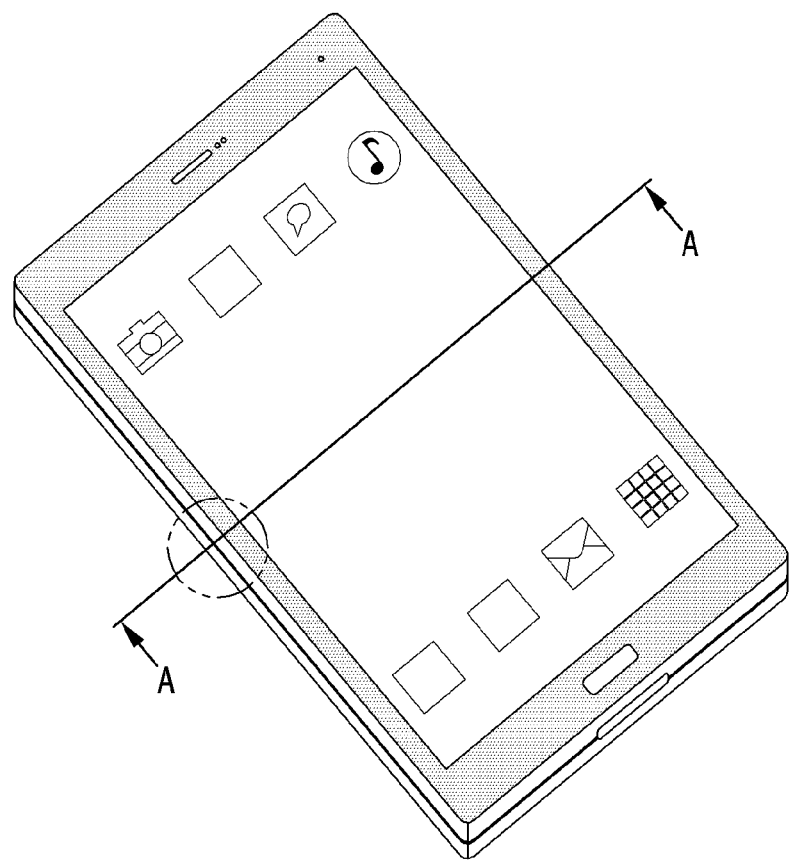
FIG. 1 is an isometric view illustrating a display device according to an exemplary embodiment of the present invention.
Figure 2:
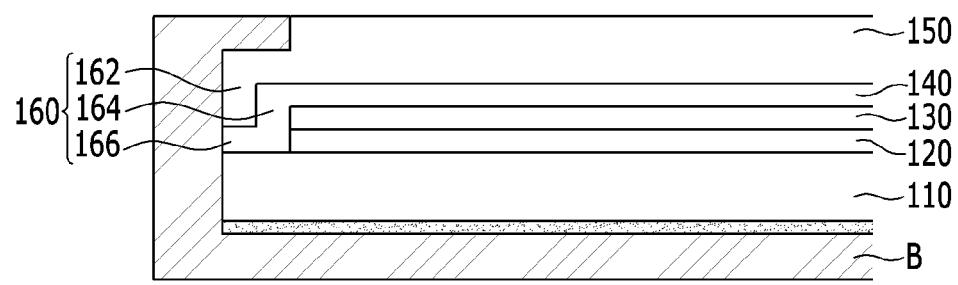
FIG. 2 is a cross-sectional view taken along line A-A of FIG. 1.
Figure 3:
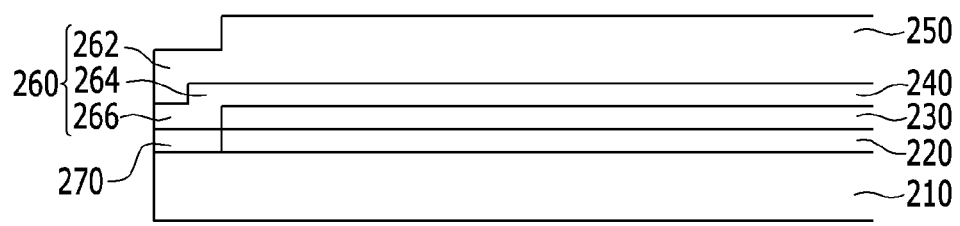
FIG. 3 is a cross-sectional view of a display device which further includes a second adhesive layer according to a modified example of the present invention.

FIG. 1 is an isometric view illustrating a display device according to an exemplary embodiment of the present invention, and FIG. 2 is a cross-sectional view taken along line A-A of FIG. 1. FIG. 3 is a cross-sectional view of a display device which further includes a second adhesive layer according to a modified example of the present invention. FIGS. 4 to 10 are diagrams illustrating a process of manufacturing the display device of FIG. 2.

In FIG. 2, a display device to which a display driving device B is coupled is illustrated. Such devices B are known, and accordingly a detailed description of the display driving device B will be omitted.

As illustrated in FIGS. 2 and 3, an exemplary embodiment of the present invention provides display devices including respective display panels 110 and 210, touch screen panels 130 and 230, and windows 150 and 250.

The display panels 110 and 210 are panels receiving an electric signal to implement an image, and may for example be panels implementing an organic light emitting diode display, a liquid crystal display, or a plasma display device. So long as the display panels 110 and 210 are panels that can convert an electric signal to an image, the display panels 110 and 210 may be included in the scope of the present invention. Accordingly, in the Figures, in order to represent that the scope of the present invention is not limited with respect to the specific type of display panels 110 and 210, detailed configuration of the display panels 110 and 210 will be omitted.

Further, the display panels 110 and 210 according to the exemplary embodiment may be flat panel types, but are not limited thereto, and may for instance be curved or foldable display panels 110 and 210. Accordingly, a substrate forming the display panels 110 and 210 may be a rigid material or a flexible material.

The touch screen panels 130 and 230 are panels that convert an input signal generated by contact from a part of a user's body or an electronic device, that is, a touch, into an electric signal.

The touch screen panels 130 and 230 are disposed on the display panels 110 and 210 respectively, and the user inputs information to the display device by pressing a body against the touch screen panels 130 and 230 according to an image displayed by the display panels 110 and 210, to operate the display device.

The touch screen panels 130 and 230 according to the exemplary embodiment may each include transparent electrodes such as ITO and CNT, but are not limited thereto, and touch screen panels 130 and 230 that apply various materials such as metal mesh, nano wire, a conductive polymer and any other suitable materials may be included. Further, the touch screen panels 130 and 230 may be any panels capable of converting a touch by the user's contact to electric signals.

The windows 150 and 250 are disposed on the touch screen panels 130 and 230 respectively, to protect the touch screen panels 130 and 230 and the display panels 110 and 210.

The windows 150 and 250 according to the exemplary embodiment may be transparent materials so as to pass an image from the display panels 110 and 210 to the outside. Further, the windows 150 and 250 may be made of rigid or flexible materials according to a physical property of the display panels 110 and 210. As an example, the windows 150 and 250 according to the exemplary embodiment may be made of a transparent rigid material such as glass or a flexible transparent plastic material. In addition, the windows 150 and 250 may be made of various other materials as desired.

In this case, the windows 150 and 250 according to the exemplary embodiment include first bent parts 162 and 262, respectively.

The first bent parts 162 and 262 are formed by extending and bending one end of the windows 150 and 250 respectively, and act to prevent foreign substances such as moisture from permeating into their respective display devices by sealing one end of the touch screen panels 130 and 230.

The first bent parts 162 and 262 according to the exemplary embodiment may be bent in directions parallel to side edges of the touch screen panels 130 and 230. Accordingly, the first bent parts 162 and 262 may cover one end of the touch screen panels 130 and 230 so as to seal at least one end of the touch screen panels 130 and 230 from contact with the environment.

Meanwhile, the display device according to the exemplary embodiment may further include polarization layers 120 and 220. The polarization layers 120 and 220 are formed between the display panels 110 and 210 and the touch screen panels 130 and 230 respectively, according to the exemplary embodiment to control an intensity of light emitted from the respective display panels 110 and 210.

In this case, the polarization layers 120 and 220 according to the exemplary embodiment may be disposed so that edges thereof coincide with the edges of the touch screen panels 130 and 230 in order to improve alignment with the touch screen panels 130 and 230 and thereafter, improve a sealing effect of the windows 150 and 250.

Further, the display device according to the exemplary embodiment may include first adhesive layers 140 and 240. The first adhesive layers 140 and 240 are formed on the touch screen panels 130 and 230 and may include second bent parts 164 and 264 in order to increase adhesion with the windows 150 and 250.

The second bent parts 164 and 264 have shapes corresponding to the first bent parts 162 and 262 formed on the windows 150 and 250, and are formed by extending and bending one end of the first adhesive layers 140 and 240 to seal one end of the touch screen panels 130 and 230 together with the first bent parts 162 and 262.

In this case, one end of the touch screen panels 130 and 230 may be sealed by directly contacting the second bent parts 164 and 264. That is, the second bent parts 164 and 264 may be folded over the sides of the touch screen panels 130 and 230, so as to contact and cover the panels 130 and 230, thus sealing their sides and preventing moisture and other impurities from contacting the panels 130 and 230.

Meanwhile, the first adhesive layers 140 and 240 according to the exemplary embodiment may further include third bent parts 166 and 266. The third bent parts 166 and 266 are extended and bent from the second bent parts 164 and 264 respectively, and the first adhesive layers 140 and 240 may be directly attached to the display panels 110 and 210 by the third bent parts 166 and 266.

In the detailed description of the present invention, the first bent parts 162 and 262 of the windows 150 and 250, the second bent parts 164 and 264 and the third bent parts 166 and 266 of the first adhesive layers 140 and 240 are together referred to as "sealing parts 160 and 260".

In the display device according to the exemplary embodiment, one end of the touch screen panels 130 and 230 may be sealed by the sealing parts 160 and 260 formed by extending and bending one end of each of the windows 150 and 250 and the first adhesive layers 140 and 240. The sealing parts 160 and 260 allow the windows 150 and 250 to seal the display panels 110 and 210, as well as the touch screen panels 130 and 230, so as to prevent foreign substances such as moisture from permeating into the display device from the outside. Accordingly, the number and frequency of defects may be reduced.

Meanwhile, the display device according to the exemplary embodiment may further include a second adhesive layer 270 in order to ensure more improved adhesion.

In FIG. 3, according to the exemplary embodiment, a display device which further includes a second adhesive layer 270 is illustrated. As illustrated in FIG. 3, the second adhesive layer 270 is formed between the first adhesive layers 140 and 240 and the display panels 110 and 210. In this case, the second adhesive layer 270 may be formed between the third bent parts 166 and 266 of the first adhesive layers 140 and 240 and the display panels 110 and 210, but is not limited thereto and may be formed on all or a part of one surface of each of the display panels 110 and 210 or the touch screen panels 130 and 230.

The second adhesive layer 270 according to the exemplary embodiment may be made of heterogeneous materials having higher adhesion than the first adhesive layers 140 and 240, and in this case, one or more of the first adhesive layers 140 and 240 and the second adhesive layer 270 may include an acryl-based resin or a silicon-based resin.

The second adhesive layer 270 is made of a material having higher adhesion than the first adhesive layers 140 and 240, to improve adhesion between the sealing parts 160 and 260 and the display panels 110 and 210 according to the exemplary embodiment. Further, the second adhesive layer 270 is formed to reduce external force (i.e. to dampen shock) applied to the windows 150 and 250 and the first adhesive layers 140 and 240 in in the process of forming the sealing parts 160 and 260. That is, the second adhesive layer 270 assists in preventing damage to the display device during formation of the sealing parts 160 and 260.

Hereinabove, the display device according to the exemplary embodiment of the present invention is described. Hereinafter, a method of manufacturing the aforementioned display device according to another exemplary embodiment of the present invention will be described in detail. However, a detailed description of already-described elements will be omitted here.

In FIGS. 4 to 10, processes of manufacturing the display device according to the exemplary embodiment are illustrated in sequence. However, the processes illustrated above are merely an exemplary embodiment of the present invention, and other sequences and configurations may be employed, as will be understood by one of ordinary skill in the art.

As illustrated in FIGS. 4 to 10, another exemplary embodiment of the present invention provides a method of manufacturing the display device including preparing display panels 110 and 210, forming touch screen panels 130 and 230, forming windows 150 and 250, and sealing the touch screen panels 130 and 230.

Figure 4:
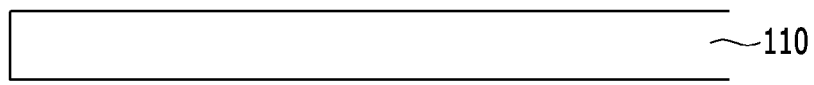
FIGS. 4 to 10 are diagrams illustrating a process of manufacturing the display device of FIG. 2.

As illustrated in FIG. 4, the display panels 110 and 210 are prepared and fabricated for implementing an electric signal as an image. For example, each display panel 110 and 210 is fabricated as an organic light emitting diode display, a liquid crystal display, a plasma display device, or the like. The preparing of the display panels 110 and 210 varies according to the type of display used for the panels 110 and 210, and since such construction is well-known, detailed description will be omitted in this specification.

Figure 5:
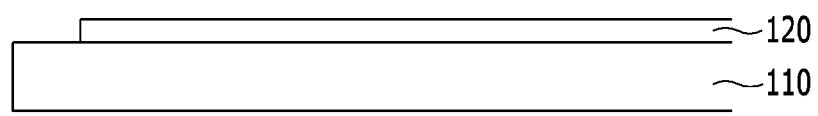

Meanwhile, as illustrated in FIG. 5, the method of manufacturing the display panels 110 and 210 according to the exemplary embodiment may further include forming polarization layers 120 and 220. The polarization layers 120 and 220 according to the exemplary embodiment are formed on the display panels 110 and 210 to control the intensity of light emitted from the display panels 110 and 210 as described above.

In this case, the polarization layers 120 and 220 according to the exemplary embodiment may improve alignment with the touch screen panels 130 and 230 subsequently formed thereon, in order to improve the sealing of these layers and thus reduce the amount of moisture and other materials that may permeate and cause damage. Accordingly, edges of the polarization layers 120 and 220 and the touch screen panels 130 and 230 may be disposed to coincide with each other.

Figure 6:
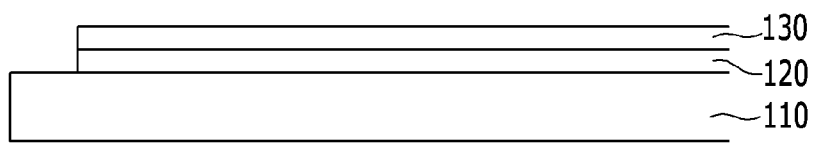

The touch screen panels 130 and 230 are then formed on the polarization layers 120 and 220, as illustrated in FIG. 6. The touch screen panels 130 and 230 convert an input signal generated by contact with a foreign body (i.e. a touch) to signals that indicate that the touch has occurred, and are fabricated in known manner using various materials such as a transparent electrode, a metal mesh, a nano wire, and a conductive polymer as described above.

Meanwhile, the method of manufacturing the display device according to the exemplary embodiment may further include forming first adhesive layers 140 and 240.

Figure 7:
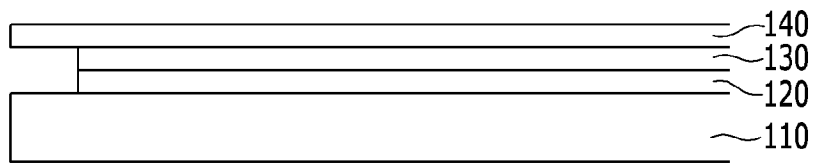

As illustrated in FIG. 7, the first adhesive layers 140 and 240 are formed between the touch screen panels 130 and 230 and the windows 150 and 250. That is, first adhesive layers 140 and 240 are formed on the respective touch screen panels 130 and 230, and windows 150 and 250 are subsequently formed thereover.

In this case, the first adhesive layers 140 and 240 may include second bent parts 164 and 264, and the sealing of the touch screen panels 130 and 230 may include forming the second bent parts 164 and 264.

In the formation of second bent parts 164 and 264, one end of each of the first adhesive layers 140 and 240 is formed to extend out over the edge of the corresponding touch screen panel 130/230, where these extensions are sized and shaped to correspond to the shape of the first bent parts 162 and 262 of the windows 150 and 250. According to the exemplary embodiment, one end of the windows 150 and 250 and one end of the first adhesive layers 140 and 240 are simultaneously heated and pressurized or pressed so as to be extended and bent, and thus the first bent parts 162 and 262 of the windows 150 and 250 and the second bent parts 164 and 264 of the first adhesive layers 140 and 240 may be formed together.

In this case, the forming of the first adhesive layers 140 and 240 according to the exemplary embodiment may further include forming third bent parts 166 and 266.

The third bent parts 166 and 266 are extended and bent from the second bent parts 164 and 264, and are formed from ends of the first adhesive layers 140 and 240. According to the exemplary embodiment, the third bent parts 166 and 266 may be formed together with the first bent parts 162 and 262 and the second bent parts 164 and 264 by heating and pressurizing or pressing the first adhesive layers 140 and 240 along with the windows 150 and 250.

According to the exemplary embodiment, the first bent parts 162 and 262, the second bent parts 164 and 264, and the third bent parts 166 and 266 may be commonly referred to as "sealing parts 160 and 260". Therefore, it can be understood that the sealing of the touch screen panels 130 and 230 is performed by forming the sealing parts 160 and 260, where these sealing parts 160/260 are formed by heating and pressurizing/pressing the windows 150 and 250 and the first adhesive layers 140 and 240 simultaneously or substantially simultaneously.

Figure 8:
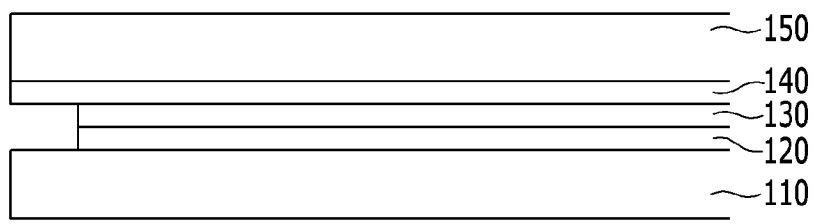

The forming of the windows 150 and 250, as illustrated in FIG. 8, is performed in order to protect the display panels 110 and 210 and the touch screen panels 130 and 230. In this case, the windows 150 and 250 according to the exemplary embodiment may be made of a transparent material in order to pass an image transferred from the display panels 110 and 210 to the outside. The transparent material is also a rigid material such as glass or a material such as a flexible plastic, as described above.

Figure 9:
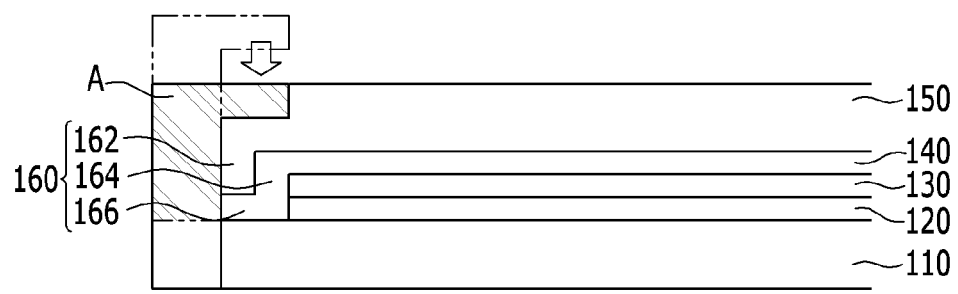

The sealing of the touch screen panels 130 and 230, as illustrated in FIG. 9, is performed as above by extending and bending one end of the windows 150 and 250 to form the first bent parts 162 and 262.

According to the exemplary embodiment, in order to form the first bent parts 162 and 262, the overhanging end of each of the windows 150 and 250 is heated and pressurized/pressed to be extended and bent. Like FIG. 9, heat and pressure may be simultaneously transferred to one end of the windows 150 and 250 by a hot pressing apparatus A, and as a result, ends of the windows 150 and 250 are extended and bent to form the first bent parts 162 and 262.

Figure 10:
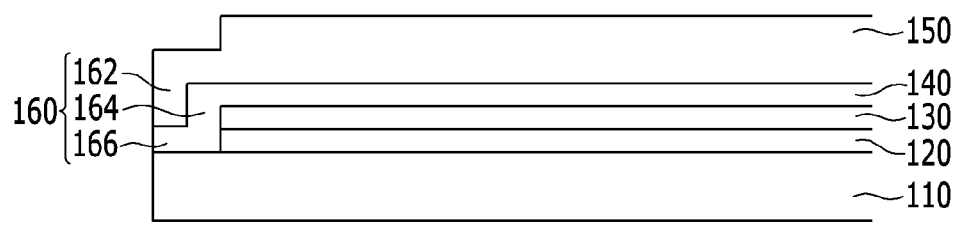

FIG. 10 illustrates the touch screen panels 130 and 230 after sealing by the first bent parts 162 and 262. The first bent parts 162 and 262 according to the exemplary embodiment may be extended and bent downward (perpendicular to the upper surfaces of the touch screen panels 130/230, parallel to edges thereof) to cover ends of the touch screen panels 130 and 230. Accordingly, since side edges of the touch screen panels 130 and 230 are covered, the touch screen panels 130 and 230 are sealed from exposure to outside elements.

The sealed display device of FIG. 10 may then be used in the display device illustrated in FIGS. 1 and 2 by coupling to the display driving apparatus B, as shown.

Meanwhile, the method of manufacturing the display device according to the exemplary embodiment may further include forming a second adhesive layer 270.

The second adhesive layer 270 has higher adhesion than the first adhesive layers 140 and 240, and is interposed between the first adhesive layers 140 and 240 and the display panels 110 and 210 to improve adhesion between the first adhesive layers 140 and 240 and the respective display panels 110 and 210.

Accordingly, according to the exemplary embodiment, as illustrated in FIG. 3, the second adhesive layer 270 is coated on a part of the display panels 110 and 210 and may be coated below the first adhesive layers 140 and 240. Further, the second adhesive layer 270 may be made of heterogeneous materials having higher adhesion than the first adhesive layers 140 and 240. In particular, one or more of the first adhesive layers 140 and 240 and the second adhesive layer 270 may include an acryl-based resin or a silicon-based resin as described above.

The second adhesive layer 270 may be heated along with the windows 150 and 250 and the first adhesive layers 140 and 240 when these latter elements are heated and pressed in the forming of the sealing parts 160 and 260. Accordingly, the second adhesive layer 270 may be melted and, if desired, hardened, together with the first adhesive layers 140 and 240. The presence of an additional adhesive layer 270 acts to cushion loads applied to the windows 150 and 250 and the first adhesive layers 140 and 240, thus reducing physical stress applied to the windows 150 and 250 and the first adhesive layers 140 and 240. As a result, it is possible to also ensure high adhesion and simultaneously prevent the damage to the display device as described above.

In summary, and according to the exemplary embodiments, the windows 150 and 250 forming the display device are directly extended and bent to seal the ends of the touch screen panels 130 and 230, thereby more efficiently preventing foreign substances such as moisture from permeating from the outside. Therefore, it is thereby possible to reduce a defect occurrence rate of products and contribute to increasing a lifespan of the products.

Although the specific exemplary embodiments have been described and illustrated as above, the present invention is not limited to the exemplary embodiments described herein, and it would be apparent to those skilled in the art that various changes and modifications might be made to these embodiments without departing from the spirit and the scope of the invention. Therefore, the changed example and modified examples should not be individually appreciated from the technical spirit or the viewpoint of the present invention and it should be appreciated that modified exemplary embodiments will be included in the appended claims of the present invention. Furthermore, different features of the various embodiments, disclosed or otherwise understood, can be mixed and matched in any manner to produce further embodiments within the scope of the invention.

DESCRIPTION OF SYMBOLS 100, 200: Display device
110, 210: Display panel
120, 220: Polarization layer
130, 230: Touch screen panel
140, 240: First adhesive layer
150, 250: Window
160, 260: Sealing part
162, 262: First bent part
164, 264: Second bent part
166, 266: Third bent part
270: Second adhesive layer
A: Hot pressing apparatus
B: Display driving apparatus

What is claimed is:

1. A display device, comprising:
 a display panel configured to generate an image;
 a touch screen panel formed on the display panel; and
 a window formed on the touch screen panel, including a first section overlapping the touch screen panel, and including a first bent part extending from the first section and positioned beyond the touch screen panel in a direction parallel to the display panel, wherein the first bent part is bent to seal one end of the touch screen panel, and wherein an upper side of the first bent part is closer to the display panel than an upper side of the first section in a direction perpendicular to the display panel.

2. The display device of claim 1, further comprising:
 a polarization layer formed between the display panel and the touch screen panel.

3. The display device of claim 2, wherein:
 the polarization layer and the touch screen panel are disposed so that a side edge of the polarization layer is substantially aligned with a side edge of the touch screen panel.

4. The display device of claim 1, further comprising:
 a first adhesive layer formed on the touch screen panel and including a second bent part of which one end is extended and bent to correspond to the first bent part to seal one end of the touch screen panel.

5. The display device of claim 4, wherein:
 the first adhesive layer further includes a third bent part extended and bent from the second bent part and attached onto the display panel.

6. The display device of claim 4, further comprising:
 a second adhesive layer interposed between the first adhesive layer and the display panel, the second adhesive layer having a higher adhesion with the display panel than the first adhesive layer.

7. The display device of claim 6, wherein:
 the first adhesive layer and the second adhesive layer comprise heterogeneous materials.

8. The display device of claim 7, wherein:
 at least one of the first adhesive layer and the second adhesive layer includes an acryl-based resin or a silicon-based resin.

9. The display device of claim 1, wherein:
 the first bent part is bent in a direction crossing an extending direction of one end of the touch screen panel disposed in parallel with the display panel to cover one end of the exposed touch screen panel so as to block a contact with the outside.

10. The display device of claim 1, wherein:
 the window comprises a glass or a plastic.

11. A method of manufacturing a display device, the method comprising:
 receiving a display panel that is configured to generate an image;
 positioning a touch screen panel on the display panel;
 positioning a window on the touch screen panel; and
 sealing the touch screen panel by a first bent part formed by extending and bending one end of the window, wherein the bending one end of the window further comprises heating and pressing the window,
 wherein the window includes a first section overlapping the touch screen panel, and
 wherein the bending one end of the window further comprises heating and pressing the window so that an upper side of the first bent part is closer to the display panel than an upper side of the first section in a direction perpendicular to the display panel.

12. The method of claim 11, further comprising:
 positioning a polarization layer on the display panel.

13. The method of claim 12, wherein the positioning a polarization layer further comprises positioning the polarization layer so that an edge of the polarization layer is substantially aligned with a side edge of the touch screen panel.

14. The method of claim 11, further comprising:
 forming a first adhesive layer interposed between the touch screen panel and the window,
 wherein the sealing the touch screen panel by the window layer includes
 forming a second bent part of which one end of the first adhesive layer is extended and bent to correspond to the first bent part to seal one end of the touch screen panel.

15. The method of claim 14, wherein:
 the sealing the touch screen panel by the window layer further includes
 forming a third bent part extended and bent from the second bent part and attached onto the display panel.

16. The method of claim 14, further comprising:
 forming a second adhesive layer having higher adhesion with the display panel than the first adhesive layer, the second adhesive layer being interposed between the first adhesive layer and the display panel.

17. The method of claim 11, wherein:
 the sealing of the touch screen panel by the window layer further includes
 forming the first bent part by bending one end of the window in a direction crossing an extending direction of one end of the touch screen panel disposed in parallel with the display panel to cover and seal one end of the exposed touch screen panel so as to block a contact with the outside.

* * * * *